July 1, 1952     R. L. CARBREY     2,602,151
TRIANGULAR WAVE GENERATOR
Filed Jan. 20, 1951
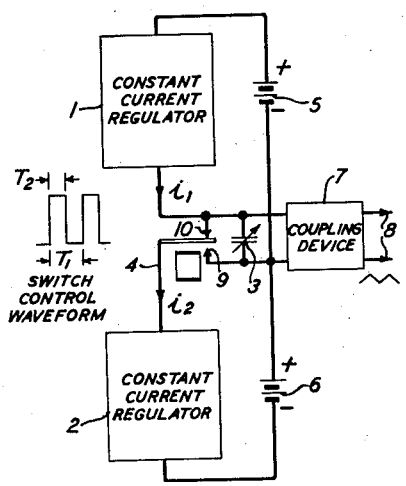
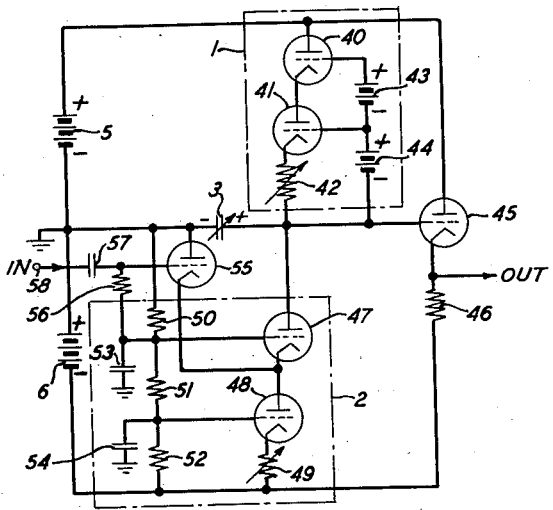
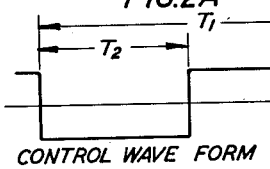
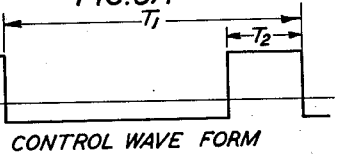
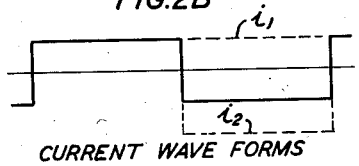
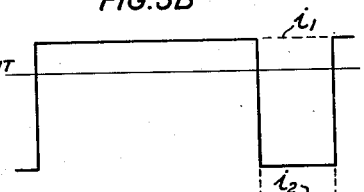
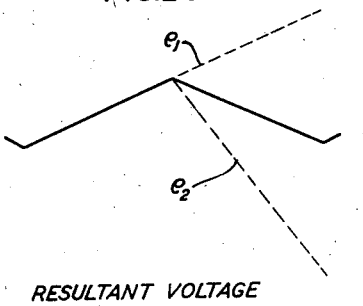
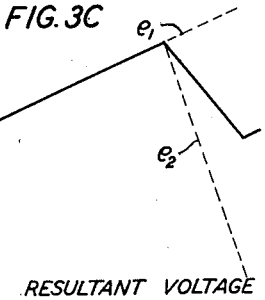
INVENTOR
R. L. CARBREY
BY W. R. Dawson
ATTORNEY Patented July 1, 1952

2,602,151

UNITED STATES PATENT OFFICE 2,602,151

TRIANGULAR WAVE GENERATOR

Robert L. Carbrey, Madison, N. J., assignor to Bell Telephone Laboratories, Incorporated, New York, N. Y., a corporation of New York Application January 20, 1951, Serial No. 207,043

6 Claims. (Cl. 320—1)

This invention relates to the generation of periodic voltages of triangular wave form.

The object of the invention is a means for generating periodic voltages having a triangular variation in amplitude, including a capacitor charged through a first constant current source to produce a linear increase in voltage across the capacitor, and means for connecting at will, across the capacitor, a second constant current source to produce a linear decrease in the resultant voltage across the capacitor.

A feature of the invention is the provision of means for adjusting the rate of decrease of the resultant voltage across the capacitor.

A further feature of the invention is a device energized by a recurrent electric wave to connect and disconnect the second constant current source from the capacitor.

In prior systems, a single constant current source has been associated with a capacitor to charge, or discharge, the capacitor, and thus to produce a linear variation in the voltage across the capacitor; but the capacitor was then discharged, or charged, through a circuit which produced a non-linear variation in the voltage across the capacitor. The present invention distinguishes from these prior systems in that the voltage variation across the capacitor during both the charging, and the discharging, is linear; and the rates of charging and discharging may each be independently controlled.

The invention will be better understood from the following description and the drawings, in which:

Fig. 1 shows a simplified block schematic of a typical system embodying the invention;

Figs. 2 and 3 show curves of voltages and currents illustrating the operation of the system; and Fig. 4 shows a typical system embodying the invention.

In Fig. 1, the constant current regulator 1 is connected in series with the source of current 5 across the capacitor 3. When the switch 4 is on the lower contact 9, a constant current flows into the capacitor 3. The linearly varying potential difference developed across capacitor 3 is supplied by a suitable coupling device 7 to the output circuit 8.

When the switch 4 is on the upper contact 10, a second constant current regulator 2, in series with the source of current 6 is connected across the capacitor 3. The constant current from the source 6 flows into capacitor 3 in the opposite direction to the constant current from the source of current 5. This reverse current may be due to a reversal of polarity of the source 6 with respect to the source 5, or to a reversal of polarity within the regulator 2.

The switch control wave form depicts the successive, recurrent operations of the switch 4. A complete cycle of operations of switch 4 occurs in a time interval $T_1$ and the switch 4 rests on contact 10 for a time interval $T_2$, so that $T_1 = kT_2$.

Using the superposition theorem, the current regulator 1 supplies a constant current $i_1$ to the capacitor 3 during the whole time the circuit is in operation. The voltage $e_1$ developed across capacitor 1 due to this current $i_1$ is $$e_1 = \frac{1}{C}\int i_1 dt$$

where C equals the capacitance of capacitor 3. However, as the current $i_1$ is constant, $$e_1 = \frac{i_1}{C}\int dt$$

thus, in the time interval $T_1$, $$e_1 = \frac{i_1 T_1}{C}$$

Fig. 2a shows the switch control wave form when $$T_2 = \frac{T_1}{2}$$

Fig. 2b shows the constant current $i_1$; and Fig. 2c shows the voltage $e_1$ rising steadily during the time interval $T_1$.

When switch 4, Fig. 1 is shifted to contact 10, a constant current $i_2$, of polarity opposite to $i_1$, will flow into the capacitor 3. Then, the voltage developed across capacitor 3 in the time interval $T_2$, $$e_2 = -\frac{i_2 T_2}{C} = -\frac{i_2 T_1}{Ck}$$

If the triangular wave form is stable about some determinate value, the voltage across the capacitor 3 at the end of a cycle must be the same as the voltage at the beginning of a cycle, thus $e_1 = -e_2$, and, as $$\frac{i_1 T_1}{C} = \frac{i_2 T_1}{Ck}$$

and $$k = \frac{T_1}{T_2}$$

therefore, $$\frac{i_2}{i_1} = \frac{T_1}{T_2} = k$$

In Fig. 2a $T_1=2T_2$, thus, as shown in Fig. 2b, $i_2=2i_1$, so that, as shown in Fig. 2c, the maximum value of $e_1$ equals the maximum value of $-e_2$ and the resultant voltage at the end of the cycle is equal to the voltage at the beginning of the cycle.

Figs. 3a, b, c, show the current and voltage wave forms when $T_1=4T_2$. Thus, when $T_1=2T_2$, the resultant voltage wave has the form of an isosceles triangle, while for other ratios, the resultant voltage wave has the form of a scalene triangle.

The operation of the system shown in Fig. 1 may also be described in a somewhat different manner. The current $i_1$ flows into the capacitor 3 for a time interval $T_1-T_2$, and the voltage across capacitor 3 rises to a voltage $$\frac{i_1(T_1-T_2)}{C}$$

When switch 4 is on contact 10, the current $i_1$ flows through the current regulator 2, and a current $i_1-i_2$ flows from capacitor 3. The decrease in the potential difference across capacitor 3 during the time interval $T_2$ will be $$-\frac{i_2-i_1}{C}T_2=\frac{i_1(T_1-T_2)}{C}=\frac{i_1T_2(k-1)}{C}$$

Thus, as before, $$\frac{i_2}{i_1}=k$$

In Fig. 4, the twin-triode 40, 41, and associated equipment in the dotted rectangle corresponds to the constant current regulator 1 of Fig. 1. The source 5 is connected to the anode of the triode section 40; the cathode of section 40 is connected to the anode of triode section 41; the cathode of section 41 is connected through an adjustable cathode resistor 42 to one terminal of capacitor 3, the other terminal of capacitor 3 being connected to the source 5. The triode sections 40, 41, may conveniently be parts of a twin-triode vacuum tube, or may be separate triode or tetrode tubes.

The cathodes of the triode sections 40, 41, are heated in known manner from some convenient source, not shown. The control grids of the triode sections 40, 41, are biased by the sources 43, 44, which are connected from the control grids to the lower end of resistor 42. Other means for biasing the control grids of the triode sections 40, 41 may be used, providing that proper consideration is given to the changes in the potential difference across capacitor 3.

The constant current from the source 5 will charge capacitor 3, causing the potential difference across capacitor 3 to change at a linear rate.

The control grid of a triode 45 is connected to one terminal of capacitor 3, and the cathode of triode 45 is connected through the coupling resistor 46 to the grounded source 6, while the anode of triode 45 is connected to the grounded source 5. The triode 45 has a negligible effect upon the potential difference developed across capacitor 3. A load circuit may be connected from the cathode of triode 45 to ground.

The triode sections 47, 48, with the associated apparatus within the dotted rectangle form the constant current regulator 2 of Fig. 1. The anode of triode section 47 is connected to resistor 42 and to capacitor 3. The cathode of triode section 47 is connected to the anode of triode section 48, while the cathode of this section is connected through an adjustable cathode resistor 49 to the source 6. The biasing resistors 50, 51, 52, are connected across the source 6 and the junctions of these resistors are respectively connected to the control grids of the triode sections 47, 48. Capacitors 53, 54 may be connected across resistors 51, 52 to reduce transient disturbances and stabilize the operation of the circuit. The triode sections 47, 48 may conveniently be sections of a twin-triode, preferably having a larger current carrying capacity than the sections 40, 41, or may be separate triodes or other suitable vacuum tubes.

The control, or gating, vacuum tube 55 corresponds to the switch 4 of Fig. 1. The anode of vacuum tube 55 is grounded, the cathode connected to the cathode of tube 47, and the signal grid connected through resistor 56 to the signal grid of tube 47. The cathodes of tubes 47, 48, 55 are energized by known means, not shown. The input terminal 58 is connected through capacitor 57 to the signal grid of triode section 55.

A signal voltage applied between terminal 58 and ground will charge capacitor 57 through resistors 56, 56, applying a voltage of like polarity to the signal grid of triode 55. Assume the signal grids of triodes 47, 55 are normally biased to $-100$ volts with respect to ground and that the applied signal voltage can change the bias on the signal grid of triode 55 from $-80$ to $-120$ volts. The triode 48 and resistor 49 together form, in effect, a cathode coupling resistor of very high resistance for the cathodes of triodes 55, 47. When the signal grid of triode 55 is driven to $-80$ volts, the cathodes of triodes 55, 47 will also rise to nearly, actually slightly above, $-80$ volts, and, as the signal grid of triode 47 is held at $-100$ volts, triode 47 will be cut off, while triode 55 is conducting fully the current passed through triode 48. Again, when the signal grid of triode 55 is driven to $-120$ volts, the cathodes of triodes 55, 47 will be nearly the $-100$ volts of the grid of triode 47, triode 55 will be cut off and triode 47 will be conducting fully the current passed through triode 48.

When the voltage from a square wave generator is supplied to terminal 58, during the positive portion of the cycle, triode 55 is conducting, triode 47 is cut off and capacitor 3 charges from the source 5 through triodes 40, 41 and resistor 42. During the negative portion of the cycle, triode 55 is cut off and triode 47 is conducting, thus, the current flowing in resistor 42, and the discharge current of capacitor 3, flow through triodes 47, 48, resistor 49 and source 6.

If the triodes 40, 41, 47, 49, have the same voltage amplification constants and the voltages of the batteries 43, 44 are equal and equal to the potential drops across resistors 51, 52 for a wave having the shape of an isosceles triangle, resistor 49 will have one-half the impedance of resistor 42, so that twice as much current must flow in resistor 49 to produce the same voltage drop as will be produced across resistor 42. Minor variations in the circuit constants may be compensated by adjustments of resistors 42, 49 until the desired values of the currents and the ratio of the currents are achieved.

If desired, the circuit may be stabilized by connecting the input circuit of a direct-current amplifier across resistor 46, and the output circuit across resistor 52. As the input and output voltages should be of the same polarity, an even number of stages of amplification may be used.

What is claimed is:

1. A generator of an electrical voltage wave having a triangular variation in amplitude, comprising a source of direct voltage having poles of opposite polarity and an intermediate tap, a capacitor having one terminal connected to said tap, a load circuit connected across said capacitor, a first constant current regulator connected from one pole of said source to the other terminal of said capacitor, a second constant current regulator connected to the other pole of said source, switching means connected from said second regulator to said capacitor for charging said capacitor through said first regulator for a first time interval by diverting the current of the second regulator from said capacitor, and for subsequently discharging said capacitor through said second regulator for a second time interval, and means for recurrently operating said switching means.

2. The combination in claim 1 in which the ratio of the currents transmitted by said first and second regulators equals the ratio of said second time interval to the sum of the time intervals.

3. The combination in claim 1 in which said time intervals are equal and the wave shape is an isosceles triangle.

4. The combination in claim 1 in which said time intervals are unequal and the wave shape is a scalene triangle.

5. A generator of an electrical voltage wave having a triangular variation in amplitude, comprising a source of direct voltage having poles of opposite polarity and an intermediate tap, a capacitor having one terminal connected to said tap, a load circuit connected across said capacitor, a first cathode resistor connected to the other terminal of said capacitor, a first plurality of space discharge devices having their anode-cathode paths connected in serial relationship from the positive pole of said source to said first cathode resistor, means for biasing the control electrodes of said devices with respect to the other terminal of said capacitor, a second cathode resistor connected to the negative pole of said source, a first and a second space discharge device having their anode-cathode paths connected in serial relationship from the other terminal of said capacitor to the second cathode resistor, other means for biasing the control electrodes of said first and second devices, a gating device having an anode connected to said tap, a cathode connected to the cathode of said first device and a control electrode biased to the same voltage as the control electrode of said first device, and circuit means connected to the control electrode of said gating device and energized by a recurrent electrical wave.

6. The combination in claim 5 in which the load circuit includes a cathode follower resistor connected to the negative pole of said source, and a space discharge device having an anode connected to the positive pole of said source, a cathode connected to said cathode follower resistor, and a control electrode connected to the other terminal of said capacitor.

ROBERT L. CARBREY.

REFERENCES CITED

The following references are of record in the file of this patent:

UNITED STATES PATENTS

| Number | Name | Date |
| --- | --- | --- |
| 2,441,387 | Berger et al. | May 11, 1948 |
| 2,455,283 | Valley | Nov. 30, 1948 |